Oct. 12, 1965  T. A. MIDDLESWORTH ETAL  3,210,921
FRUIT PICKER
Filed Aug. 3, 1962  3 Sheets-Sheet 2

INVENTORS
Tommy A. Middlesworth
Harold G. Meitl
Anthony S. Wunar
Paul O. Pippel
Atty.

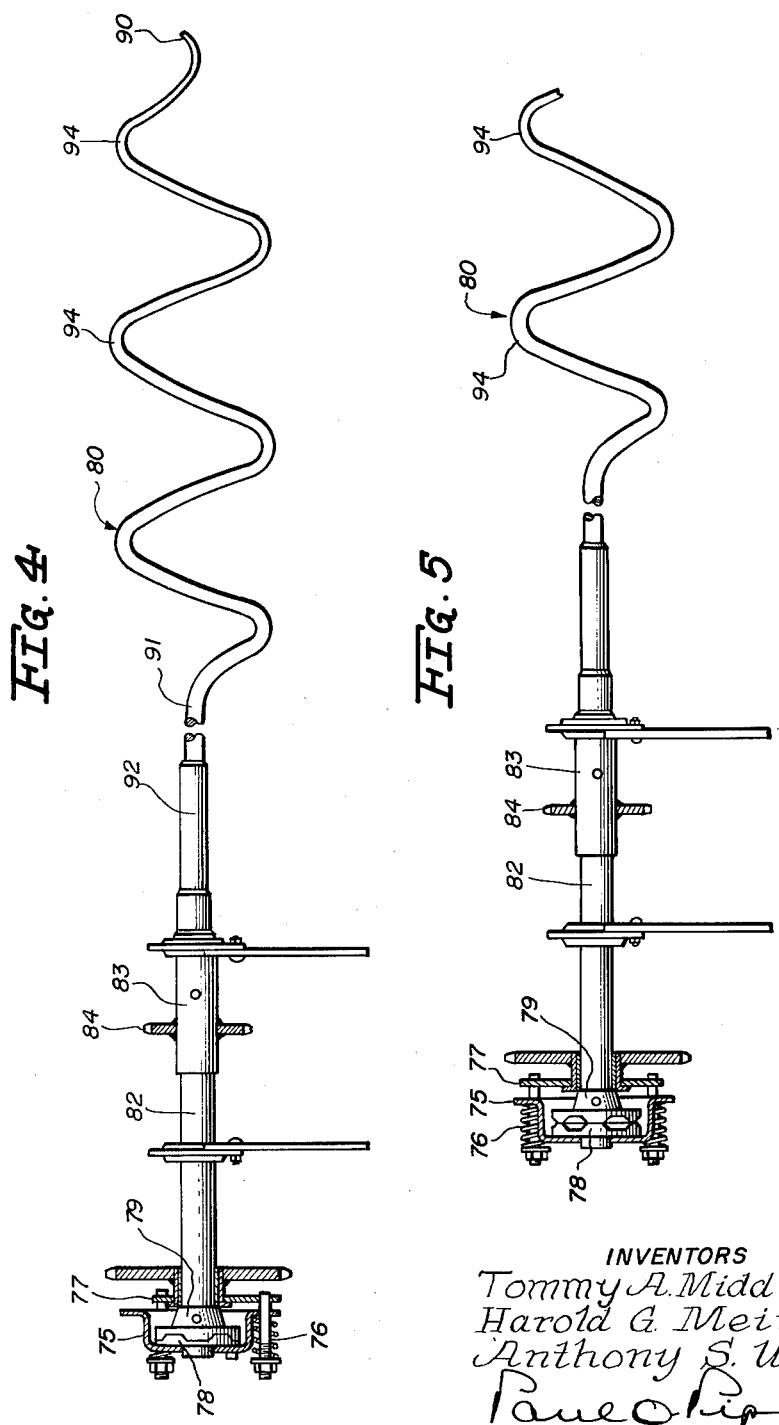

United States Patent Office 3,210,921
Patented Oct. 12, 1965

3,210,921
FRUIT PICKER
Tommy A. Middlesworth and Harold G. Meitl, Hinsdale, and Anthony S. Wunar, Chicago, Ill., assignors to International Harvester Company, Chicago, Ill., a corporation of New Jersey
Filed Aug. 3, 1962, Ser. No. 214,601
8 Claims. (Cl. 56—328)

This invention relates to harvesters and more specifically to a novel fruit picker.

The harvester under consideration is particularly adaptable for the picking of fruit such as citrus fruit and particularly oranges. In the picking of oranges, our experience has indicated that the fruit, in addition to being pulled, must be twisted or otherwise snapped off the stem and this combination of pulling and twisting or snapping must be so proportioned as to prevent tearing off the calix of the orange, otherwise excessive plugging occurs wherein the skin is ruptured or torn which causes premature spoilage. In certain previous developments which we have conducted in conjunction with the structure shown in U.S. patent application Serial No. 747,275 now Patent 3,040,507, filed by Fred D. Lasswell, Jr., on July 8, 1958, for harvesters, we have found that in certain tree growths the rigid spindles shown in the patent had considerable difficulty penetrating the plant and adequately removing the fruit. The percentage of picking in such circumstances was materially reduced.

A general object of the invention is to provide a novel picker for citrus fruit and the like comprising a panel having a plurality of picker spindles which are adapted to be advanced into the tree for projecting the spindles thereinto, said spindles being flexible in order to yield around different obstructions such as branches and the like.

A further object of the invention is to provide a novel fruit picker spindle which is substantially of corkscrew shape.

The invention contemplates the provision of a plurality of side-by-side arranged spindles which are mounted at one of their ends on a panel or support and which are geometrically spaced in order to provide extensive and uniform area coverage and wherein the spindles are adapted to be rotated in such a pattern that adjacent spindles upon entry into the tree tend to rotate and twist the fruit off the stems, said spindles being flexible to accommodate the passage of the fruit therebetween and also to pass around obstructions such as branches and the like.

A further object of the invention is to provide a novel picker for fruit and the like comprising spindles, each spindle having a helical form terminating in an outer free end point, said spindles adapted to be rotated and functioning in the nature of augers penetrating the tree and providing helical surfaces adapted to grasp the fruit therebetween these surfaces functioning upon withdrawal from the tree to flip the fruit and thus to strip it from the stems.

These and other objects inherent and encompassed by the invention will become more readily apparent from the specification and the drawings, wherein:

FIGURE 4 is an enlarged sectional view taken substantially on the line 4—4 of FIGURE 2 showing the clutch in engaged position; and FIGURE 5 is a view comparable to FIGURE 4 illustrating the clutch in its slipped position.

Figure 1:
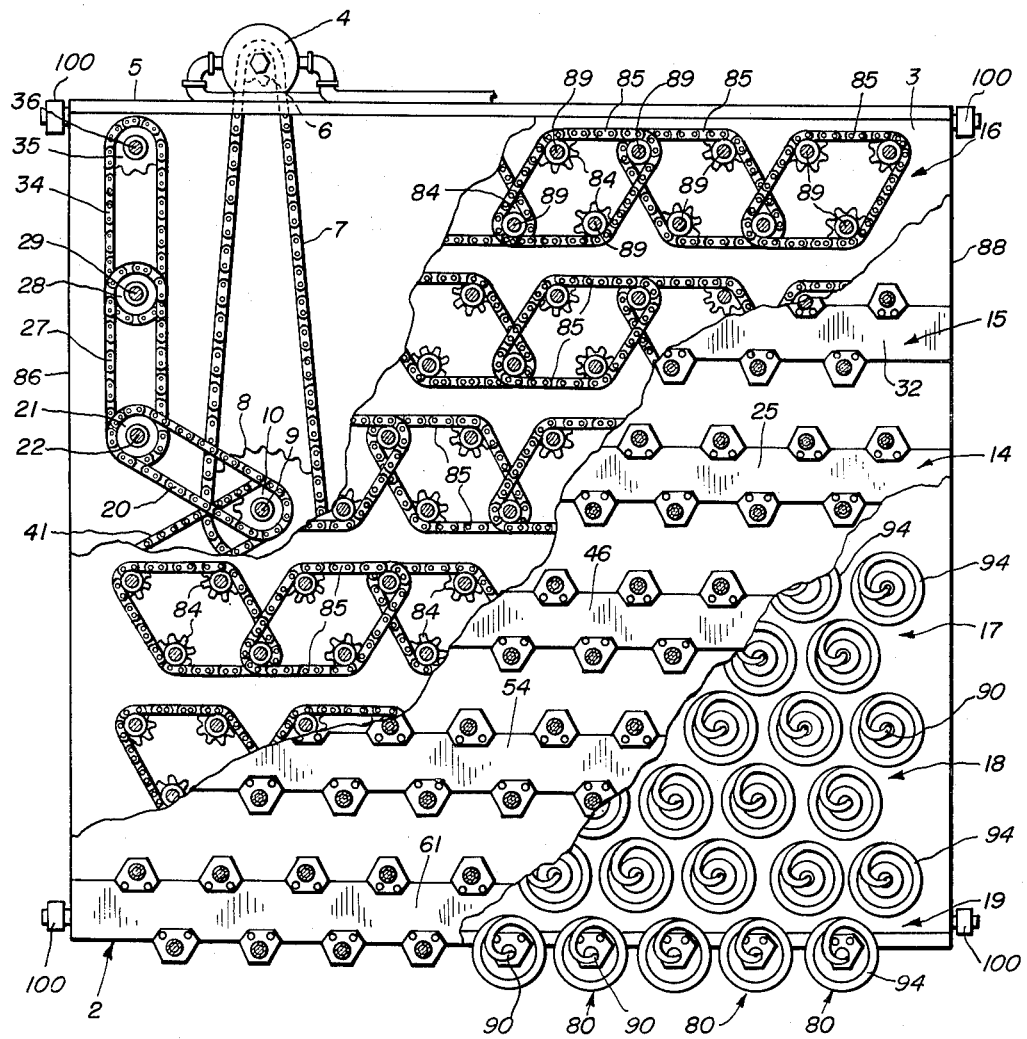
FIGURE 1 is a front view of the picker panel broken away in steps from front to rear illustrating the arrangement, the mounting and the drive for the spindles.

Describing the invention in detail and having particular reference to the drawings, there is shown a picker head generally designated 2 of the novel fruit picker, the picker head being supported from associated mounting and positioning structure in a manner somewhat similar to that shown in the beforementioned U.S. patent application Serial No. 747,275. For the present invention, the specific mounting or operation of the panel 3 is of no specific significance except that it will be understood that the panel 3 and the structure carried thereon is adapted to be elevated and also moved laterally into and out of the associated fruit tree.

The panel 3 is preferably a quadrilateral structure although this specific shape is not in any way controlling but is preferable from the point of view of manufacture, fabrication, and handling. A hydraulic motor 4 is supported on beam 5, the motor 4 being suitably driven by a source of hydraulic fluid as well known to those skilled in the art and driving a sprocket 6 which in turn drives a chain 7, the chain 7 driving a master gear 8 which in turn drives the main drive shaft 9 to which are connected the sprockets 10 and 11, the sprocket 10 drives the upper banks or horizontal rows of spindles generally designated 14, 15, and 16 and the sprocket 11 drives the lower banks or horizontal rows of spindles 17, 18, and 19.

The drive proceeds from the sprocket 10 through the chain 20 to the sprocket 21 journaled on the countershaft 22 mounted on bearings 23 and 24 from the framework or module 25 which constitutes the bank 14. The shaft 22 drives through sleeve 21' a sprocket 26 which in turn drives a chain 27 which in turn drives a sprocket 28 which is journaled on the shaft 29, the shaft 29 being suitably mounted on bearings 30 and 31 on the module framework 32 of the spindle bank 15. The shaft sprocket 28 drives a sprocket 33 through sleeve 28', the sprocket 33 driving the chain 34 which in turn drives the sprocket 35 which is journaled on the shaft 36 which is mounted in bearings 37 and 38 on the framework or the module 39 of the spindle bank 16. Similarly, the sprocket 11 drives a chain 41 which in turn drives a sprocket 42 which is journaled on the shaft 43, shaft 43 being suitably mounted in bearings 44 and 45 on the framework or module 46 of the spindle bank 17. A sprocket 42 drives sleeve 42' which drives a sprocket 48 which drives a chain 49 which in turn drives a sprocket 50 which is journaled on the shaft 51, shaft 51 being suitably mounted in bearings 52 and 53 carried from the module framework 54 of the bank of spindles 18. The sprocket 50 is connected to a sleeve which is fastened to a sprocket 55 which drives a chain 56 which drives a sprocket 57 journaled on shaft 58, the shaft 58 being mounted on bearings 59 and 60, said bearings 59 and 60 being mounted on the framework or the module 61 of the lowermost bank of spindles 19.

It will be seen that the sprockets 21, 26 are mounted on a common sleeve 21' and thus rotate together about the shaft 22 in that the sprockets 28, 33 are mounted on a common sleeve 28' and thus rotate together about the shaft 29, that sprocket 35 is mounted on a sleeve 35' which rotates about the shaft 36, that the sprockets 42, 48 are mounted on a common sleeve 42' thus rotate together about the shaft 43, that the sprockets 50, 55 are mounted on a common sleeve 50' and rotate together on the shaft 51 and that the sprocket 57 is mounted on a sleeve 57' and rotates on the shaft 58.

Figure 2:
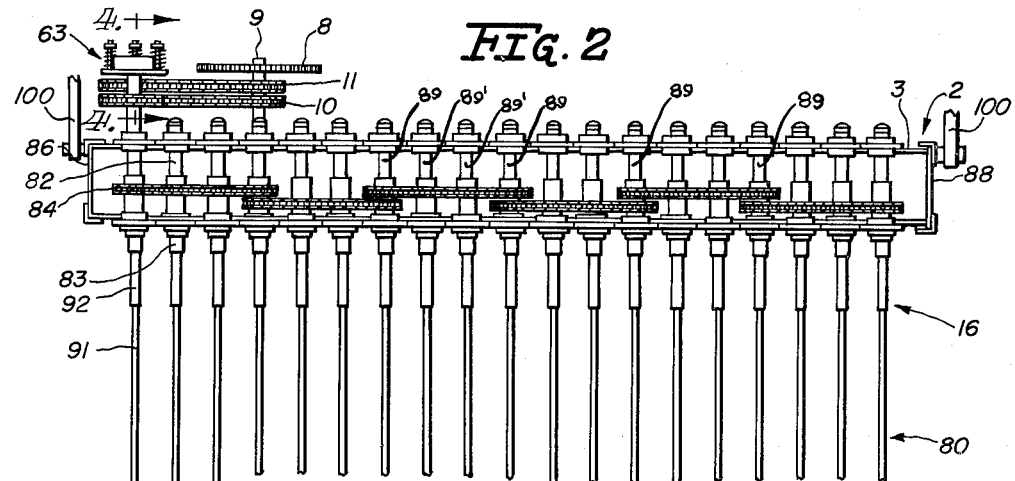
FIGURE 2 is a fragmentary plan view of the structure shown in FIGURE 1.
Figure 3:
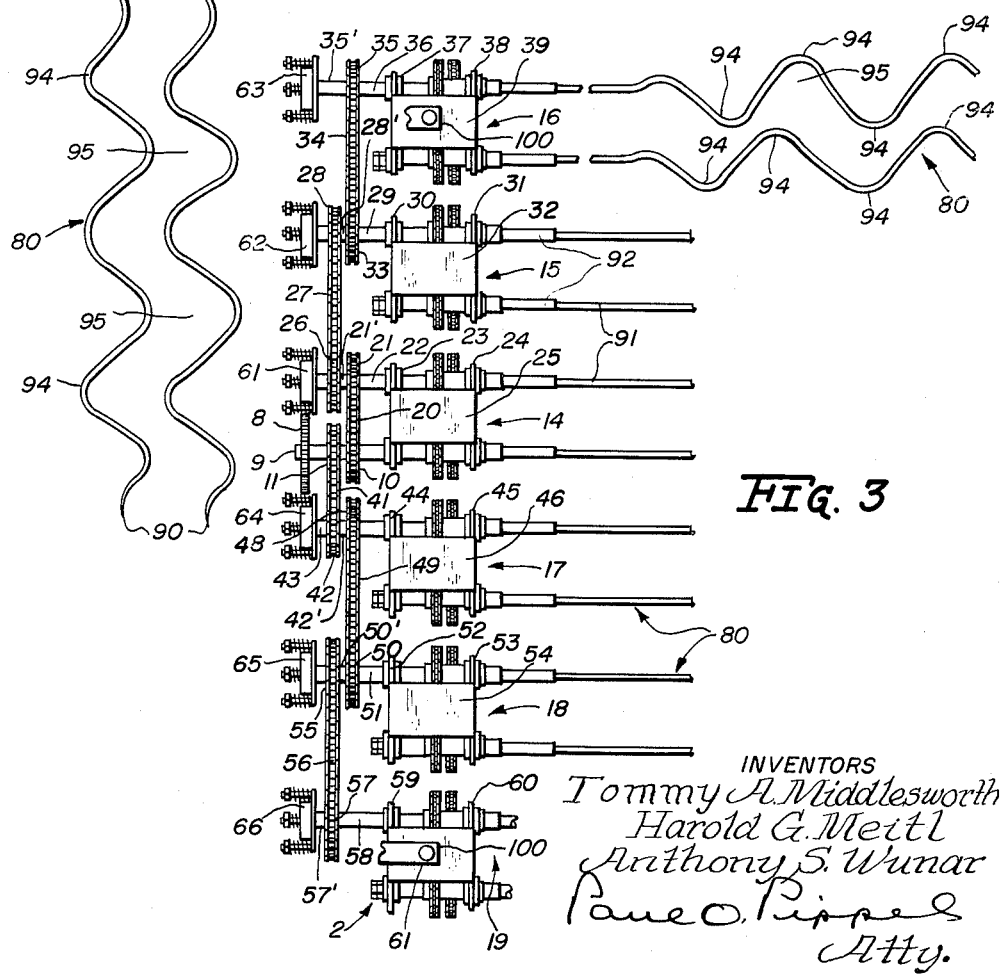
FIGURE 3 is a fragmentary side elevational view.

The sleeves 21', 28', 35', and 42', 50' and 57' are respectively connected to the shafts 22, 29, 36, 43, 51, and 58 through the medium of one position clutches 61, 62, 63, 64, 65, and 66. It will be noted from a consideration of FIGURES 1, 2, and 3 that the drives from the main drive shaft 9 to the respective modules above and below the main drive shaft are all located along one edge of the picker panel. It will be also understood that each of the clutches 61 through 66 are of the so-called one-position clutches. In other words, if some reason any bank of spindles should become obstructed and cannot rotate then the clutch must make one complete full revolution before the drive can again be initiated through the respective clutch. This maintains all of the spindles as hereinafter described in timed relation with each other.

Each clutch comprises a driving member and a driven element, the driving member or assembly including a cover case 75 which is yieldably connected through a spring and bolt assembly 76 to an annular plate 77 which is connected to the associated sprocket sleeve. The cover 75 carries the toothed driving jaw clutch element 78 which mates with a companion driven jaw clutch toothed member 79, the latter being connected to the related shaft.

In the present instance, the spindles generally designated 80 are arranged in quadriads in a rhomboidal pattern and each spindle is connected to a shaft 82 through a sleeve 83 which carries a sprocket 84, the sprockets of the quadriad group spindles being interconnected by a chain 85. The spindles, of course, along the leftwardmost edge 86 of the panel are, of course, connected to their respective shafts 22, 29, 36, 43, 55, 58. Thus it will be seen that the drive input for each module or bank of spindles is initiated from the leftward edge of the panel and proceeds toward the rightward edge 88 and that the diagonally opposed shafts 89 of each quadriad carry a double sprocket 84 to transfer the power or the drive along the length of the module to the succeeding spindles rightwardly thereof of the bank of spindles. The shafts 89' carry single sprockets.

It will be appreciated that each spindle as best seen in FIGURES 4 and 5 as well as in the lower right-hand corner of FIGURE 1 is of corkscrew conformation and comprises a helical coil of alloy steel rod which is tapered from an outer free end point 90 to a root end 91, said point 90 and the root end 91 being coaxial and the root end portion 91 extending axially of the coil and being projected and suitably fastened within the sleeve extension 92, which in turn is connected to the associated mounting sleeve 83. The root end portion 91 is located substantially on the central axis of the picker finger or member 80. It will be seen that the spindles are so timed that adjacent coil portions 94 are in substantial parallelism throughout the lengths of the spindles and are rotated in timed sequence to maintain such parallelism. This is necessary in this arrangement in order to prevent adjacent coils from twining with each other, thus becoming entangled either with each other or with branches of the tree between which the fingers move. By arranging these adjacent convolutions to obtain an undulate space 95 therebetween the fruit which is trapped in these undulate spaces or pockets is subjected to an oscillating or flipping action upon withdrawal of the spindles.

In operation of the instant device, the panel is advanced into a tree by any convenient means such as the operators 100 as described in the aforementioned patent application Serial No. 747,275 and the fingers are rotated in such direction that they corkscrew or auger into the tree among its branches. Under normal procedure the rotation of the fingers is stopped once maximum penetration is achieved and then the panel is quickly withdrawn from the tree thereby stripping the fruit off the tree with attendant lateral vibration of the yieldable or springlike fingers at an extremely fast rate of speed. In actuality, it only takes a few seconds for the fingers to penetrate the tree and a few seconds for the fingers to be withdrawn from the tree, the fingers being made of steel of the order of 50 to 80 inches in length and being of a thickness from $5/16$ of an inch at the tip to $5/8$ of an inch at the root end. The nature of the tree, its growth, limb structure, and disposition of the fruit, etc., dictate the specific design of spindle to be used. The spacing between adjacent spindles horizontally was 6.38 inches and vertically 5.53 inches and the coil diameters of the spindles was about 4.5 inches.

What is claimed is:

1. A fruit picking spindle comprising an elongated helical structure wherein the successive spaced helixes define fruit-receiving pockets, and a root end portion connected to said helical structure and extending axially thereof.

2. A fruit picking spindle according to claim 1 and said structure being thin and being laterally deflectable to bypass branches and the like.

3. The invention according to claim 1 and said helical structure being resilient and laterally deflectable to bypass branches and the like during penetration into a tree and said helical structure being axially expandable.

4. The invention according to claim 1 and said spindle being formed of spring wire.

5. The invention according to claim 4 and said spring wire being tapered from one end of the spindle to the other and having at its thinner end a tree penetrating point.

6. A fruit picking spindle comprising a thin, flexible, elongated member having a root portion and another portion defining a plurality of axially spaced fruit-receiving pockets, said spindle adapted to penetrate a tree and to receive tree-borne fruit within the pockets whereby as the spindle is withdrawn from the tree the fruit is stripped from the tree.

7. In a fruit harvester, a support, a plurality of picker spindles rotatably mounted on the support in position to penetrate a fruit laden tree, each spindle comprising a thin elongated member having a plurality of axially spaced pocket portions and a root portion journalled on the support, means associated with the support adapted to rotate the spindles when the spindles are penetrating the tree, and further means associated with said support to withdraw the spindles from the tree with the fruit within the pockets for stripping the fruit off the tree.

8. The invention according to claim 7 and said spindles disposed in adjacent relation and the pocket portions of the spindles opposing each other transversely of the spindles, said opposing pocket portions adapted to grasp fruit therebetween.

References Cited by the Examiner

UNITED STATES PATENTS

| | | | |
|---|---|---|---|
| 317,123 | 5/85 | Haff | 81—3.45 |
| 423,541 | 3/90 | Todd | 56—50 |
| 3,040,507 | 6/62 | Lasswell | 56—328 |
| 3,077,720 | 2/63 | Grove et al. | 56—328 |

ANTONIO F. GUIDA, *Primary Examiner.*

RUSSELL R. KINSEY, T. GRAHAM CRAVER,
*Examiners.*